United States Patent Office 2,858,188
Patented Oct. 28, 1958

2,858,188

PRODUCTION OF PERCHLORATES

John F. Haller, Niagara Falls, N. Y., assignor to Olin Mathieson Chemical Corporation, a corporation of Virginia No Drawing. Application February 4, 1953
Serial No. 335,171

7 Claims. (Cl. 23—85)

My invention relates to the production of perchlorates from corresponding chlorates by reaction in acid solution with ozone. The process is simple and can be operated safely on any scale with high yields and minimum reagent losses. The process is specially susceptible to continuous operation, and in one aspect may be operated as a cyclic process with particular advantage. Unlike the conventional process for producing perchlorates by electrolysis of chlorate solutions, no strategic materials are required. In the electrolytic process platinum electrodes are required and platinum losses result by consumption during processing.

My invention is based upon discovery that a chlorate dissolved in a mineral acid of sufficient strength to release chlorine dioxide in the solution may be oxidized to perchlorate by reacting the solution with ozone at a temperature within the range of about 50° to 120° C. The reaction apparently is common to the chlorates and the choice of starting chlorate is dictated by the perchlorate desired and the processing economics. The latter are governed primarily by solubility considerations since a starting chlorate of reasonably high solubility in the acid solution and a product perchlorate of reasonably low solubility are most desirable in terms of yield per unit of solution treated and product recovery. The availability of the starting chlorate also is a factor, and for this reason the alkaline chlorates such as sodium chlorate, potassium chlorate and calcium chlorate are most suitable. Sodium chlorate is particularly useful, having appreciably greater solubility in the reaction solution than potassium chlorate.

The acid employed may be a strong mineral acid such as sulfuric, nitric, phosphoric, or perchloric, for example. It must be a non-reducing acid in the reaction environment, and hence the halogenic acids, e. g. hydrochloric are unsuitable. I have found that perchloric acid provides special advantages in yield and in application of the process to commercial scale operations. Contamination and losses occasioned by the presence of a foreign ion are eliminated, and greater operating safety is afforded. The strength of the acid is important and appears to be associated with the influence of acid strength in release of chlorine dioxide in the chlorate solution. For this reason I have postulated a reaction mechanism which involves intermediate oxidation of chlorine dioxide by ozone as a controlling step. An acid strength of about 50% by weight appears to be sufficient to provide sufficient concentration of chlorine dioxide in solution for initiation and maintenance of the desired oxidation reaction. The acid solution however must not be so concentrated that solubility of the chlorate is reduced to an uneconomic extent or so concentrated that recovery of the perchlorate by precipitation and separation is retarded. With 60% perchloric acid solution, for example, up to about 12 to 15% of sodium chlorate may be added. In the case of perchloric acid, the concentration at which the hydrate forms is limiting since pure perchloric acid begins to evolve at higher concentrations, with accompanying hazard of explosion.

In application of the invention, I have found that particularly desirable results are obtained by passing the acid solution of chlorate through a packed tower and contacting the solution in the tower countercurrently with ozone. A continuous cyclic process then may be readily established by treating the effluent solution from the tower for recovery of perchlorate, reconcentrating the treated solution and returning it to the tower. The ozone may be generated conventionally, for example, from oxygen or air by the Welsbach high frequency electric discharge method. A dilute stream of ozone in oxygen or air then is formed which is diffused into the liquid entering the lower portion of the packed tower or column. I have found that the column system of countercurrent contact provides important advantages in faster reaction rate and improved ozone utilization. The system is susceptible of closer temperature control and safety is enhanced since only a small amount of solution is in contact with free ozone at any time. The flow rate is controlled in order to utilize all of the ozone in the charge stream. Since the system is corrosive, it is advantageous to use glass, ceramics or special alloys in construction of the contact and transfer equipment.

In operation, a solution of sodium chlorate in 60% perchloric acid, for example, is prepared and the preheated solution is introduced near the top of a packed tower. Although the reaction is exothermic, it is necessary to supply heat to generate chlorine dioxide to initiate and maintain the reaction. The temperature must be controlled to prevent undue chlorine dioxide decomposition. A good operating range is about 80° to 85° C. although more broadly the temperature may vary from about 50° to 120° C. The ozone-bearing stream, advantageously ozone in oxygen, is diffused into a lower section of the tower. Unreacted gas is separated from the top of the tower, and may be scrubbed with an alkali such as caustic soda, soda ash and the like in the form of solid particles or a liquid solution in order to remove acid contaminants of chlorine which may be formed in small proportion. Advantageously, the gas stream is recycled to the ozonation zone after addition of make-up oxygen. The effluent solution from the bottom of the tower is treated for recovery of perchlorate. For example, with sodium perchlorate the solution is cooled and crystallized perchlorate is removed by centrifugation or filtration. The solution also can be treated with a salt such as potassium chloride to promote the efficiency of separation by formation of the more insoluble potassium perchlorate although this introduces unnecessary complexity into the recovery operation. If sulfuric acid is used as the acid medium, perchloric acid can be recovered from the effluent solution by distillation. The treated solution after separation of perchlorate advantageously is reconcentrated in sodium chlorate by addition of make-up chlorate and is recycled to the packed tower.

Experimental observation seems to support the reaction mechanism that I have postulated, namely that chlorine dioxide is released by warming the solution of chlorate in strong acid and the dissolved chlorine dioxide then reacts with the ozone. The actual mechanism however is not at all certain and is immaterial with respect to application of the invention.

I claim:

1. A process for the production of a perchlorate from a corresponding chlorate which comprises reacting a solution of a chlorate in an aqueous non-halogenic strong mineral acid of about 50 to 70% concentration by weight with ozone at a temperature of about 50° to 120° C.

2. The process of claim 1 in which the acid is perchloric acid.

3. The process of claim 1 in which the acid is sulfuric acid.
4. The process of claim 1 in which the acid is nitric acid.
5. The process of claim 1 in which the chlorate is sodium chlorate.
6. The process of claim 1 in which the chlorate is potassium chlorate.
7. A cyclic process for continuously producing a perchlorate from a corresponding chlorate which comprises passing a solution of a chlorate in aqueous perchloric acid of about 50 to 70% concentration by weight through a packed tower, generating an ozone-bearing gas from oxygen in an ozonation zone, introducing the ozone-bearing gas to the tower in countercurrent contact with the chlorate solution, treating the effluent solution from the tower for removal of perchlorate, adding make-up chlorate to the treated tower effluent and recycling it to the tower, recovering the effluent gas stream from the tower, adding make-up oxygen and returning it to the ozonation zone.

References Cited in the file of this patent

UNITED STATES PATENTS 1,141,266     Raschig  ---------------- June 1, 1915

OTHER REFERENCES

Bennett et al.: Transaction of the American Electrochemical Society, vol. 29, pp. 335–7 (1916).